D. L. J. BROADBENT & E. ALDERSON.
COUNTERSINK AND OTHER DRILL.
APPLICATION FILED JAN. 17, 1912.

1,095,185. Patented May 5, 1914.

Inventors
David Leslie James Broadbent,
Edwin Alderson.

UNITED STATES PATENT OFFICE.

DAVID L. J. BROADBENT AND EDWIN ALDERSON, OF SOUTHPORT, ENGLAND.

COUNTERSINK AND OTHER DRILL.

1,095,185.

Specification of Letters Patent.

Patented May 5, 1914.

Application filed January 17, 1912. Serial No. 671,592.

*To all whom it may concern:*

Be it known that we, DAVID LESLIE JAMES BROADBENT and EDWIN ALDERSON, subjects of the King of Great Britain, residing in Southport, in the county of Lancaster, in the Kingdom of England, have invented certain new and useful Improvements in Countersink and other Drills, of which the following is a specification.

This invention has for its object a simple form of drill in which a hole preferably to any desired depth can be drilled with a countersink above, or other enlargement made, and then stopped automatically when the countersink or other enlargement is sufficiently deep.

Figure 1:
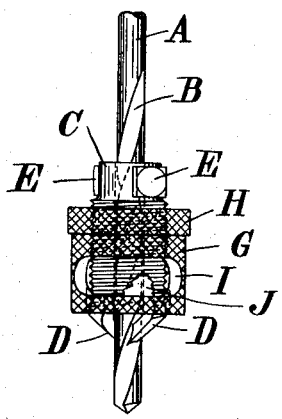
Figure 2:
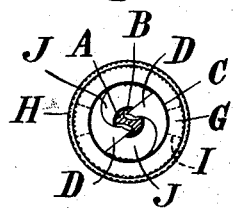
Figure 3:
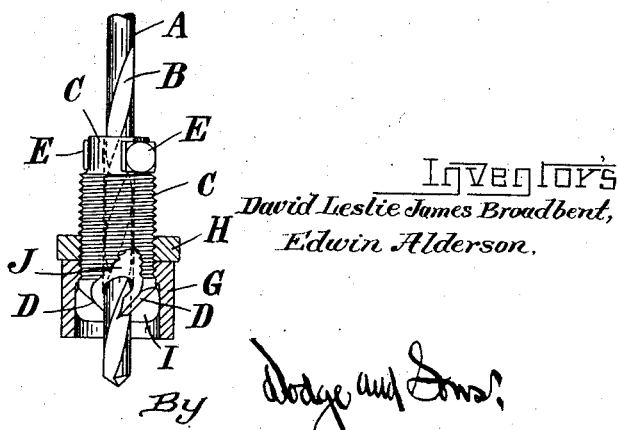

Our apparatus is best set forth by aid of the accompanying drawing, in which,

Figure 1 an elevation of our most improved form of device, Fig. 2 a plan view of same, and Fig. 3 a view showing countersinking device out of operation.

In these A is an ordinary twist drill having the spiral groove B.

C is a mainly cylindrical piece having a cylindrical hole through which the drill passes. It has two extensions or cutters D formed in one with it, the point of each of which enters the groove as shown. If the drill were made with only one groove there would only be one of these cutters, but we do not recommend this, as it is far better to have two. E is a setscrew. There may be two or more of these if desired.

G is a cylindrical piece screwed on to the part C, and capable of being screwed up and down so as to expose the cutters D to a greater or less degree. It is shown in Fig. 3 as entirely covering the cutters D so that if the tool be used with the parts as shown in said figure it would simply drill a hole with the pointed bottom the depth which the drill passes through beyond the end of the cylinder G.

H is a check-nut also screwed on the part C. By screwing this check-nut and the part G up to any required height any depth of countersink can be given, the tool ceasing to act as soon as the bottom of part G touches the surface being drilled. These parts G and H are preferably milled as shown in Fig. 1, and have two large hiatuses cut out in them so as to allow cuttings to freely fall out there.

Speaking now of Fig. 1, the mode of action is as follows: If it be desirable to form a hole for a screw of a given depth and countersink, the drill A is passed through the cylinder C until it projects below the cutters D the depth required for the screw hole below the countersink. Screws E are now screwed up tight so as to fix the drill in place. Cylinder G is now screwed down cylinder C until its bottom leaves exposed the desired amount of countersink in the cutter D. The check-nut H is now screwed down to tighten cylinder G. The tool is now ready to drill the holes, and will drill the exact length required of both hole and countersink, stopping drilling the moment the bottom of cylinder G comes against the article being drilled. The cuttings escape out through the wide hiatus I. It will be obvious that in place of the mere countersink cutters D, cutters of any other shape could be used, so as to allow of a flat headed screw or screw with other shaped head so as to enable the hole made to exactly fit the head of the screw to be used. It will be noted that the points of the cutter which are formed upon the bottom of the cylinder enter the groove of the twist-drill, and their cutting edges are tangential to a circle struck from a center coincident with the center of the drill. This construction produces a clear cut in the countersunk portion of the material.

We claim as our invention—

1. In a drilling device, the combination of a twist-drill; a cylinder having a longitudinal perforation formed therein of a size adapted to fit the drill and through which said drill extends, the exterior of said cylinder being threaded; means for clamping the cylinder in place on the drill at any required distance from the point; a cutter formed integrally with the bottom of the cylinder and having its points entering the grooves in the drill; a stop cylinder mounted upon the threaded portion of the first-named cylinder, the lower end thereof being flat; and a check-nut coöperating with said stop cylinder to hold the same in its adjusted position.

2. In a drilling device, the combination of a twist-drill; a cylinder having a longitudinal perforation formed therein of a size adapted to fit the drill and through which said drill extends, the exterior of said cylinder being threaded; means for securing the cylinder in its adjusted position on the drill; a cutter formed integrally with said cylinder at its lower end; a stop cylinder mounted upon the threaded portion of the first-named cylinder, said stop cylinder being cut away at a point above the bottom face thereof for a large part of its circumference; and a set-nut mounted upon the first-named cylinder above the stop cylinder and adapted to lock said stop cylinder in its adjusted position, whereby the base of the stop cylinder may be made flat and thus act as a stop for the drill and automatically prevent further cutting.

3. In a drilling device, the combination of a twist-drill; a cylinder provided with a longitudinal bore adapted to make a relatively close fit with said drill when the latter is passed through the bore, the exterior of the cylinder being threaded; a pair of cutters formed integrally with the lower portion of said cylinder, the points thereof extending inwardly into the grooves in the drill and their cutting edges being arranged tangentially to a circle struck upon a center coincident with the center of the drill, the lower side walls of said cylinder being cut away in the formation of the cutters to produce passages for the material removed by the cutters; and a stop cylinder adjustably mounted upon the first-named cylinder, the lower end of said stop cylinder being flat and said cylinder being provided in its side walls with large openings adapted to communicate with the cut-away portions in the lower end of the first-named cylinder through which the cuttings may pass.

In witness whereof we have hereunto signed our names this 5th day of January, 1912, in presence of two subscribing witnessses.

D. L. J. BROADBENT.
E. ALDERSON.

Witnesses:
W. P. THOMPSON,
CHAS LESLIE.